(12) United States Patent
Yoon

(10) Patent No.: US 10,537,802 B2
(45) Date of Patent: Jan. 21, 2020

(54) METHOD FOR OUTPUTTING MESSAGE USING GAME RESULT INFORMATION WINDOW

(71) Applicant: Jong Min Yoon, Seoul (KR)

(72) Inventor: Jong Min Yoon, Seoul (KR)

( * ) Notice: Subject to any disclaimer, the term of this patent is extended or adjusted under 35 U.S.C. 154(b) by 178 days.

(21) Appl. No.: 15/745,977

(22) PCT Filed: Jul. 22, 2016

(86) PCT No.: PCT/KR2016/007994
§ 371 (c)(1),
(2) Date: Jan. 18, 2018

(87) PCT Pub. No.: WO2017/014590
PCT Pub. Date: Jan. 26, 2017

(65) Prior Publication Data
US 2018/0207529 A1    Jul. 26, 2018

(30) Foreign Application Priority Data

Jul. 22, 2015    (KR) .......................... 10-2015-0103607

(51) Int. Cl.
| A63F 13/46 | (2014.01) |
| A63F 13/79 | (2014.01) |
| A63F 13/87 | (2014.01) |
| G06Q 50/00 | (2012.01) |

(52) U.S. Cl.
CPC .............. *A63F 13/46* (2014.09); *A63F 13/79* (2014.09); *A63F 13/87* (2014.09); *A63F 2300/303* (2013.01); *G06Q 50/01* (2013.01)

(58) Field of Classification Search
USPC .......................................................... 463/1
See application file for complete search history.

(56) References Cited

U.S. PATENT DOCUMENTS

| 8,327,371 B2 * | 12/2012 | Horii ....................... G06F 9/505 709/226 |
| 2009/0199198 A1 * | 8/2009 | Horii ....................... G06F 9/505 718/104 |

FOREIGN PATENT DOCUMENTS

| JP | 2003044746 A | 2/2003 |
| JP | 2008012221 A | 1/2008 |
| JP | 2014071480 A | 4/2014 |
| KR | 10-2012-0119615 A | 10/2012 |
| KR | 10-2014-0130769 A | 11/2014 |

* cited by examiner

*Primary Examiner* — Pierre E Elisca
(74) *Attorney, Agent, or Firm* — Patent Office of Dr. Chung Park

(57) ABSTRACT

A method for outputting a message using a game result information window. The method includes: dynamically determining, by a computer system, the size of an area for displaying additional information on a first user in a game result display window and whether to display the additional information, using the result of a game played by the first user; and extracting the additional information on the first user, reflecting the same in game result display window data, and transmitting the game result display window data to a second user terminal so as to display the game result display window data in the game result display window. When it is determined that the additional information on the first user is displayed, the retrieved additional information on the first user is displayed in the area for displaying the additional information on the first user in the game result display window.

9 Claims, 10 Drawing Sheets

Game result display window

| Group | ID | Score |
|---|---|---|
| SUMMARY | | |
| ① | Desk and Chair | 317,231,120 |
| ① | Choco Pie | 301,123,401 |
| ① | Pittsburgh | 278,368,152 |
| ① | Pirates | 258,530,502 |

Fig. 1

METHOD FOR OUTPUTTING MESSAGE USING GAME RESULT INFORMATION WINDOW

CROSS-REFERENCE TO PRIOR APPLICATIONS

This application is a national Stage Patent Application of PCT International Patent Application No. PCT/KR2016/007994, filed on Jul. 22, 2016 under 35 U.S.C. § 371, which claims priority of Korean Patent Application No. 10-2015-0103607, filed on Jul. 22, 2015 which are all hereby incorporated by reference in their entirety.

TECHNICAL FIELD

The present invention relates to a method of displaying the results of game. More particularly, the present invention relates to a method of dynamically dividing a display space for each user according to a specific condition and processing information to be displayed so that the information is dynamically retrieved and displayed when displaying the results of game play.

BACKGROUND ART

With the help of the development of the computing technology and the expansion of wired/wireless Internet infrastructure, users have become able to enjoy various types of game using smartphones, home game consoles or personal computers.

In general, when game play is finished, the results of the game are displayed on a screen.

FIG. 1 is a diagram illustrating a game result display window according to a conventional technology.

The results of game play may be displayed every stage or may be collected, accumulated and displayed for a specific period. A user may check his or her own record through the results and also check the results of game play of a clan or party to which the user belongs or the rank or scores of other persons not related to the user.

As described above, users feel interest through a competition with other users or feel satisfactory when his or her scores increase, while watching the results of game play.

In particular, in on-line game enjoyed by a plurality of users, the results of game play are collected depending on an area or an access server, and some types of game display ranks for all of worldwide gamers.

In the past, the results of game play were displayed so that a user could check play results in a numeral form. However, in the recent trend, the results of game play are used to check who are top gamers and at which level a user is located or to form a party or clan with other users having a similar skill.

That is, a game play result display window deviates from means for simply displaying the scores of gamers in a numeral form, but has the possibility as the space for notifying a user of himself or herself or showing or introducing him or her to other persons.

However, a conventional technology merely displays game results in a numeral form, and has a limit not using the game results and more.

DISCLOSURE

Technical Problem

The present invention has been developed to solve the conventional problems, and the present invention is to propose a methodology using a game rank display window, displayed through various spaces, locations and a platform, as a window for introducing or providing notification of a user in addition to simply displaying the results of game play in a numerical form.

Furthermore, the present invention proposes a methodology for providing an opportunity to display the message of a user to a user who satisfies a specific requirement as a result of game play, while operating in conjunction with social network service, or providing an opportunity to match and display external information provided by a third party to a user who satisfies a specific requirement as a result of game play.

Technical Solution

In order to achieve the objects, a message output method using a game result information window according to an embodiment of the present invention includes a 130-th step of dynamically determining, by a computer system, the size of an additional information display region of the game result display window of a first user and whether or not to display additional information of the first user using the game play results of the first user; and a 140-th step of retrieving, by the computer system, the additional information of the first user, incorporating the additional information into game result display window data and transmitting the game result display window data to a second user terminal so that the game result display window is displayed.

In this case, the game result display window visually displays game play results of two or more users, and the game result display window includes a basic display region in which the game play results of each user are displayed and further includes the additional information display region in which additional information of at least one user is displayed.

The additional information of the first user is displayed in the additional information display region of the first user of the game result display window through a screen of the second user terminal.

Meanwhile, a 110-th step of providing a registration interface for message feed subscription to the first user terminal prior to the 130-th step may be further included.

In this case, a previously subscribed and registered social network service message of the first user may be stored in a stack using a last in first out (LIFO) method, and the message may be retrieved from the stack and incorporated into the game result display window data as the additional information of the first user.

Meanwhile, a 120-th step of providing a user interface to the first user terminal may be further included so that an external information type may be selected, wherein the external information includes meta data not related to a specific user and for content and type classification and is previously collected and loaded information.

In this case, external information which belongs to pieces of external information corresponding to the external information type selected by the first user and which is matched with the game play results of the first user may be dynamically selected and incorporated into the game result display window data as the additional information of the first user or external information which belongs to pieces of external information corresponding to the external information type selected by the first user and which is matched with the meta data of game content played by the first user may be dynamically selected and incorporated into the game result display window data as the additional information of the first user.

In this case, as the external information is dynamically selected, the size of the additional information display region may be dynamically determined depending on a level of contribution of the provider of the selected external information.

When the second user selects the additional information display region of the first user displayed in the game result display window, a condition for selecting the external information is inversely collected and a game play condition for selecting corresponding external information may be provided to the second user terminal.

In this case, when the game play results of the second user satisfy the provided condition, the same external information as the external information provided to the first user may be incorporated into the game result display window data as the additional information of the second user.

Advantageous Effects

In accordance with the present invention, a game rank display window can be used as a window for introducing or providing notification of a user by displaying a message of a user or external information without being limited to only a space for displaying game play results.

In particular, there are effects in that an opportunity to display a message of a user can be provided to a user who satisfies a specific requirement as a result of game play while operating in conjunction with social network service and an opportunity to match and display external information provided by a third party can be provided to a user who satisfies a specific requirement as a result of game play.

DESCRIPTION OF DRAWINGS

FIG. 1 is a diagram illustrating a game result display window according to a conventional technology.

BEST MODE FOR INVENTION

Figure 2:
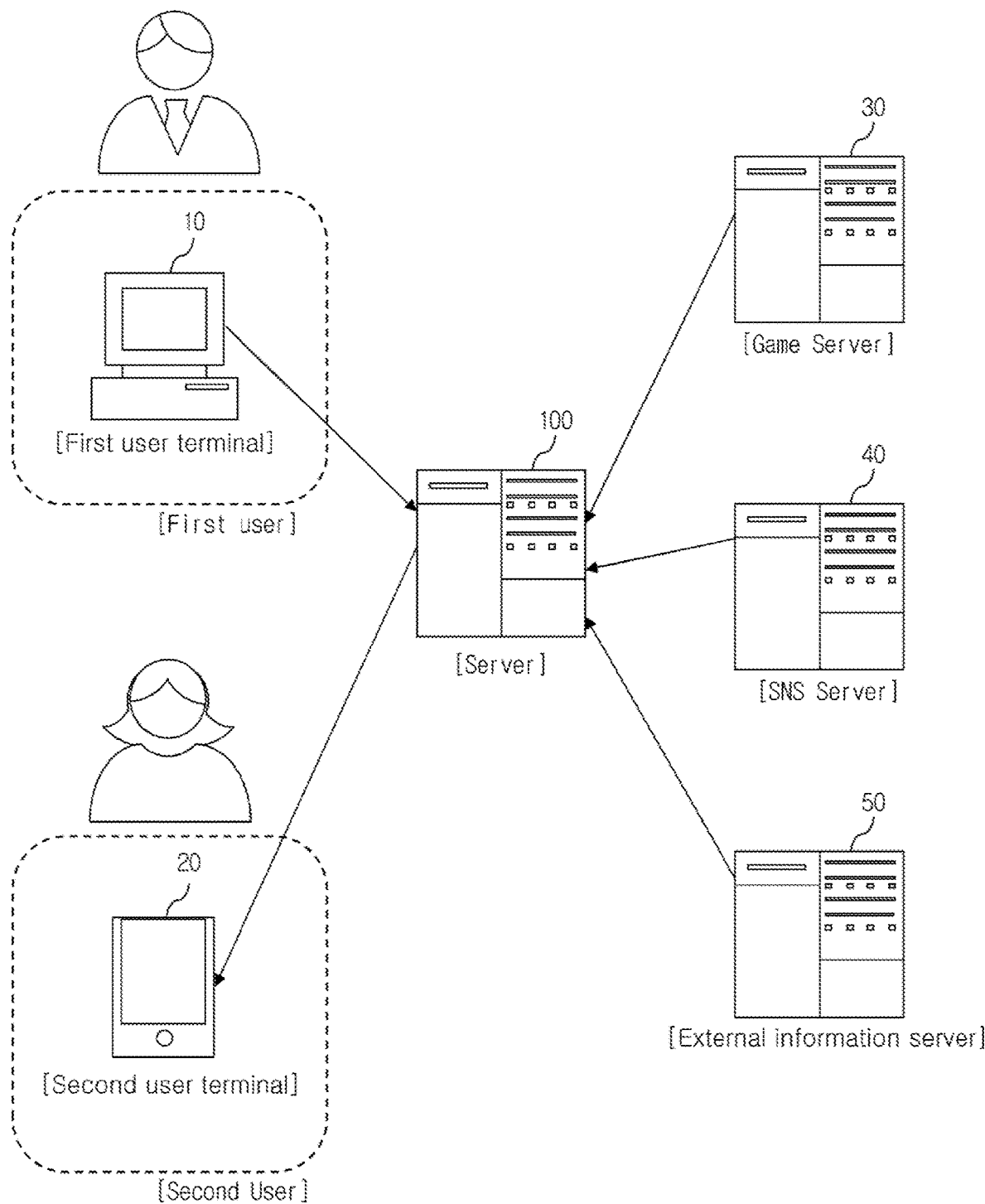
FIG. 2 is a diagram illustrating the connection relation between a server, a user terminal, a SNS server, and an external information server.

Hereinafter, the present invention is described in detail with reference to preferred embodiments of the present invention and the accompanying drawings, but it is presupposed that the same reference numerals denote the same elements.

In the detailed description or claims of the invention, when it is said that one element "includes" the other element, the word "include" should not be construed as including only the corresponding element, unless explicitly described to the contrary, but should be construed as further including other elements.

Furthermore, in the detailed description or claims of the invention, an element named "~means", "~unit", "~module" or "~block" means a unit for processing at least one function or operation, and each one may be implemented by software, hardware or a combination of them.

Hereinafter, "game" means software which may be enjoyed by one or more gamers using input devices mounted on a gaming device or input devices to which the gaming device is connected. In general, game is performed in such a manner that a player character is directly manipulated or a motion of an object within the game is manipulation. The genre of game is divided into role playing, adventure, and arcade.

Hereinafter, "on-line game" means game that must pass through a network for the play of game. In general, on-line game means game in which two or more gaming devices at remote places are connected over a network and synchronized through a server for the play of the game. If game satisfies the definition, there is no limit to the forms of a gaming device that executes game. Game executed in a mobile such as a smartphone, game operating in conjunction with a plurality of different gaming devices (also including different types of gaming devices) or executed in a cloud, and any game satisfying the definition in addition to game executed in a personal computer or a game console is construed as belonging to on-line game.

Hereinafter, a game result display window is the results of game play that have been visually displayed, and preferably means that the game play results of two or more users have been displayed in a single window. For example, a game result display window may be the display of scores or a rank obtained in each stage or may be the display of the accumulated rank of a plurality of gamers.

In this case, the game result display window preferably includes a basic display region in which the game play results of each user are displayed, and further includes an additional information display region in which additional information about at least one user is displayed.

Hereinafter, the basic display region is one of a plurality of regions divided in the game result display window, and means a region in which the game play results of each user are displayed. Preferably, the basic display region has the same size except a special case. In general, a plurality of basic display regions is vertically arranged.

Hereinafter, the additional information display region is a unique concept of the present invention, and means a space divided to display information other than game play results within a basic display region of the game result display window.

An important thing is that an additional information display region is not divided in the basic display regions of all of users and the additional display region may be separately divided only in the basic display region of a specific user depending on the results of game play. In this case, the size of the basic display region of a corresponding user is determined to be relatively greater than that of the basic display region of another user not having an additional display region.

Such an additional information display region is not always displayed when the game play results of a specific user are displayed. Whether an additional information display region will be displayed or not is dynamically determined depending on game play results.

Hereinafter, the additional information is information not related to the game play of a user, and means information displayed in an additional information display region. For example, the additional information may be a message set by a user or specific content previously provided by a third party other than a user.

Hereinafter, external information indicates additional information previously provided by a third party other than a user. The external information means information that is not associated with a specific user and that includes content and meta data for type classification.

Hereinafter, a personal connection index in social network service means that how many personal connections are present in a social network, how actively a user acts, and how many followers are present are calculated in a numerical value.

FIG. 2 is a diagram illustrating the connection relation between a server, a user terminal, an SNS server, and an external information server.

Referring to FIG. 2, a server 100 is connected to a plurality of user terminals 10 and 20, a game server 30, an SNS server 40 and an external information server 50.

For convenience sake, a user who belongs to a plurality of users and whose additional information display region has been configured in a game result display window because her or his game play results have satisfied a specific condition is referred to as a first user, and a user who belongs to a plurality of users and who views the additional information display region of the first user through the game result display window is referred to as a second user.

A terminal used by the first user is referred to as the first user terminal 10, and a terminal used by the second user is referred to as the second user terminal 20.

The first user terminal 10 and the second user terminal 20 may be computing devices which exchange data over a network or can visually display a game result display window.

For example, the user terminal may have a form, such as a personal computer, a laptop, a smartphone, or a tablet computer.

The game server 30 provides a game service to users accessed over a network. Preferably, the game server provides on-line game in which two or more users can play together.

The SNS server 40 provides social network service. Users may post messages or posts or may communicate with each other on social network service provided by the SNS server 40 using their terminals.

The external information server 50 receives external information from one or more third parties not related to the first user or the second user in advance and stores the received information.

The server 100 dynamically reconfigures information to be displayed in a game result display window using the game play results of the first user through the game server 30, and provides the information in response to a request from the second user terminal 20.

In FIG. 2, the server 100 has been expressed as a single hardware resource, for convenience sake. However, in general, a plurality of server groups having the same function is disposed depending on their loads or a plurality of servers is disposed by function in a distributed computing environment, and operates in conjunction with each other. Accordingly, the server 100 may be a form of a server group including a plurality of servers.

Figure 3:
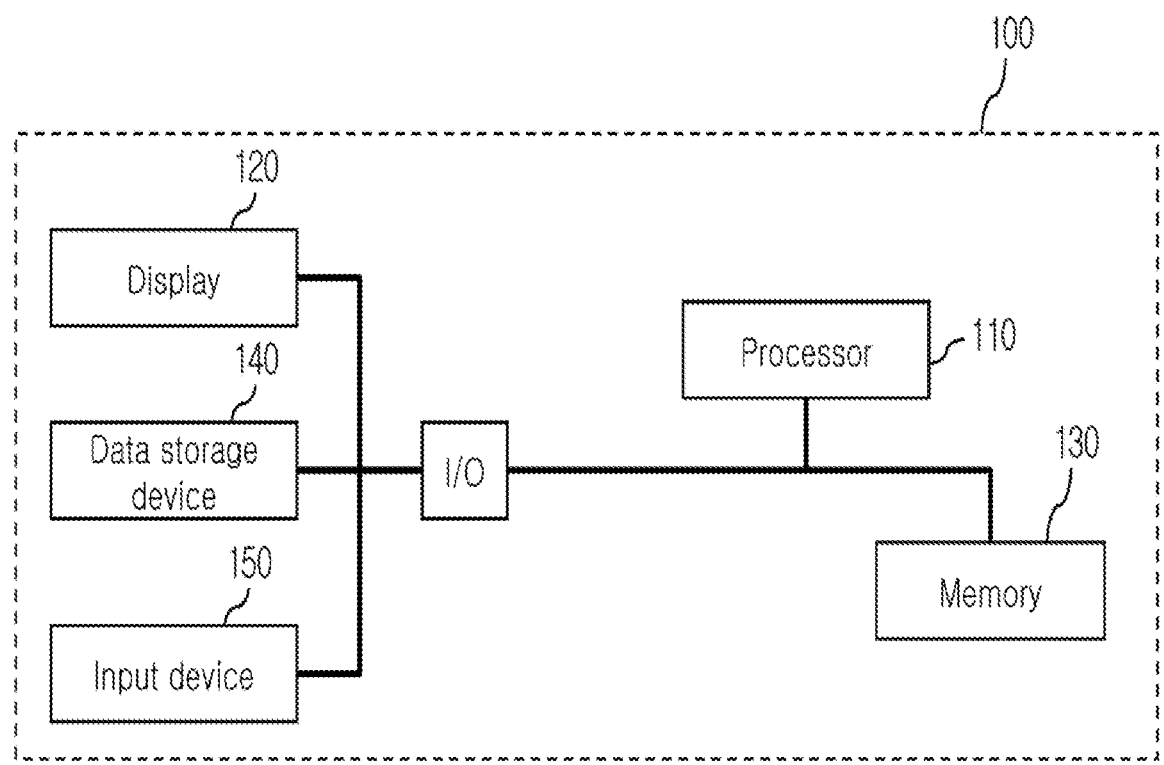
FIG. 3 is a block diagram illustrating the configuration of a computer system in which the present invention is executed.

FIG. 3 is a block diagram illustrating the configuration of a computer system in which the present invention is executed.

Referring to FIG. 3, the server 100 includes a processor 110, a display 120, memory 130, a data storage device 140 and an input device 150.

The processor 110 is commonly referred to as a central processing unit (CPU) and executes instructions included in a computer program.

The storage device 140 is means for storing a computer program and a variety of types of data, and data stored in the storage device is not lost although the supply of power is cut off. For example, a hard disk drive, a solid state drive, and flash memory correspond to the data storage device.

The network adapter means an extension card or devices of other forms used to connect a computer to a LAN or the Internet. The network adapter is a device for communication according to the known wired or wireless communication standard.

The display 120 is a device visually displaying data. A liquid crystal display (LCD) monitor or a touch screen corresponds to the display.

The input device 150 is means for enabling a user to manipulate a computer system. A keyboard, a mouse and a joystick correspond to the input device.

The present invention may be implemented in the form of such a server 100 or may be implemented in the form of a computer program executed in the server 100 depending on a method executed in the server 100.

Embodiment 1

Hereinafter, an embodiment of a message output method using a game result information window according to the present invention is described with reference to FIGS. 4 to 6.

Embodiment 1 illustrates a process of displaying a message directly written or recorded by the first user in association with social network service in a game result display window.

Figure 4:
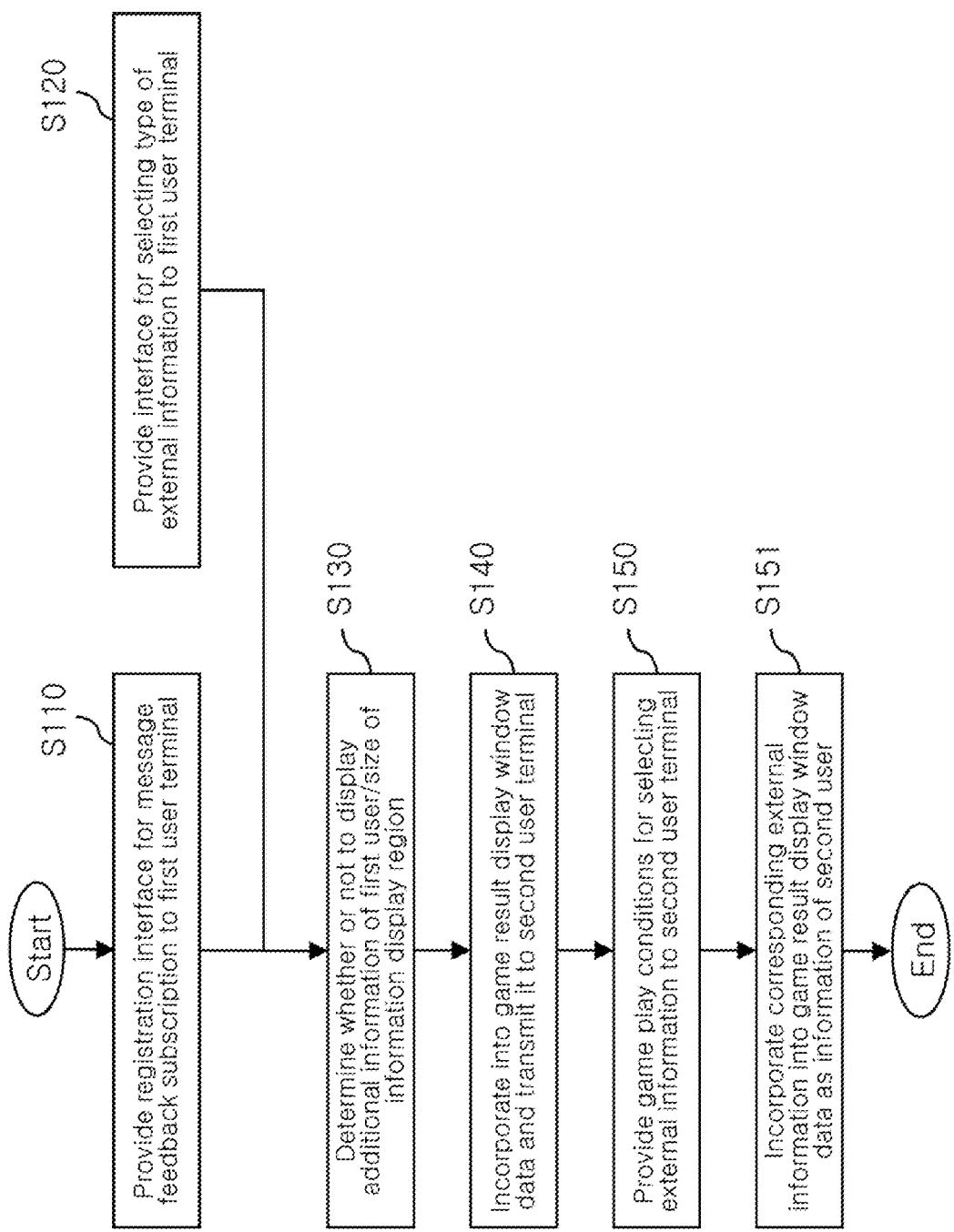
FIG. 4 is a flowchart illustrating a message output method using a game result information window according to the present invention.

FIG. 4 is a flowchart illustrating a message output method using a game result information window according to the present invention.

Figure 5:
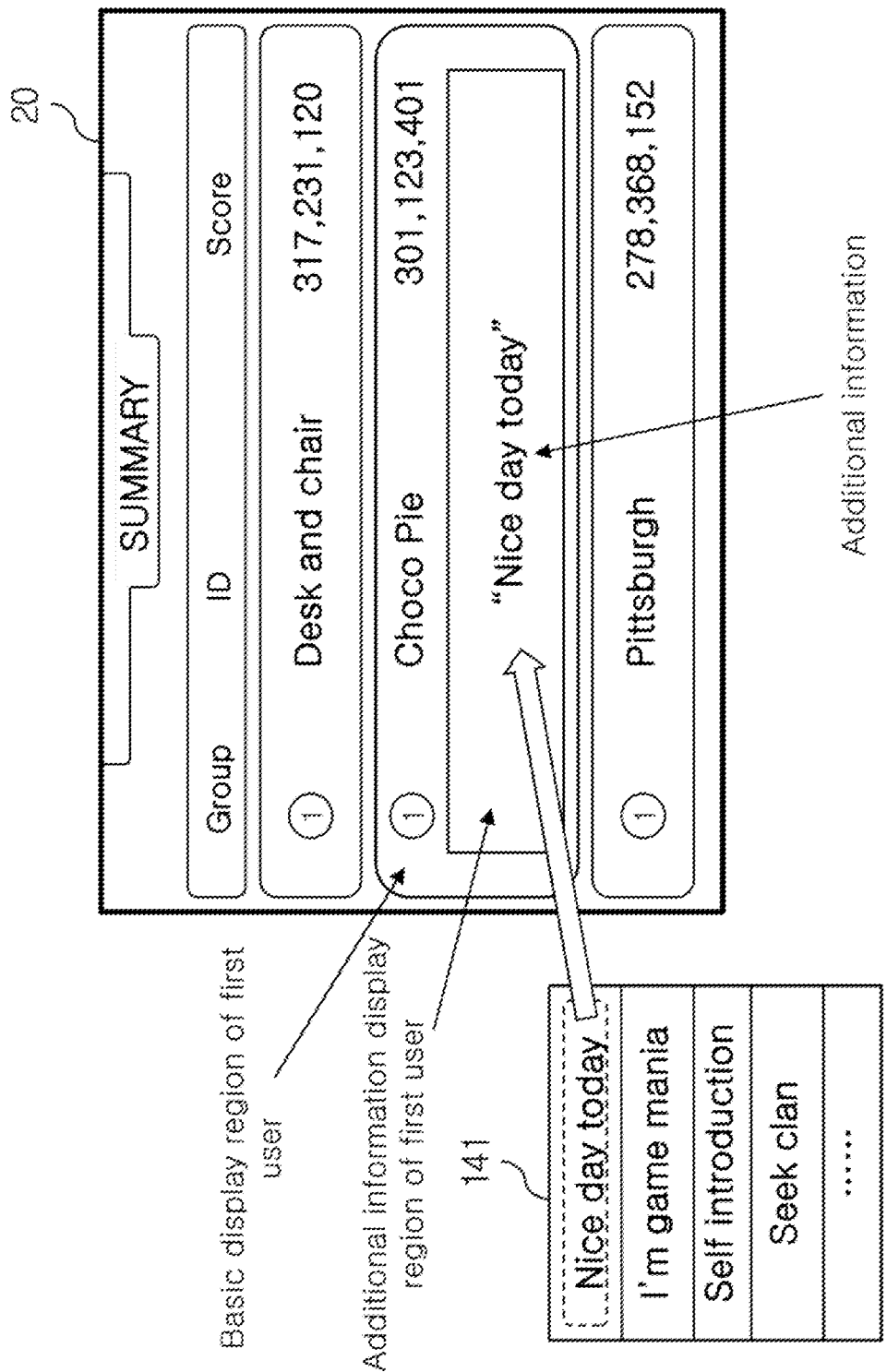
FIG. 5 is an exemplary screen showing a game result display window according to a first embodiment of the present invention.
Figure 6:
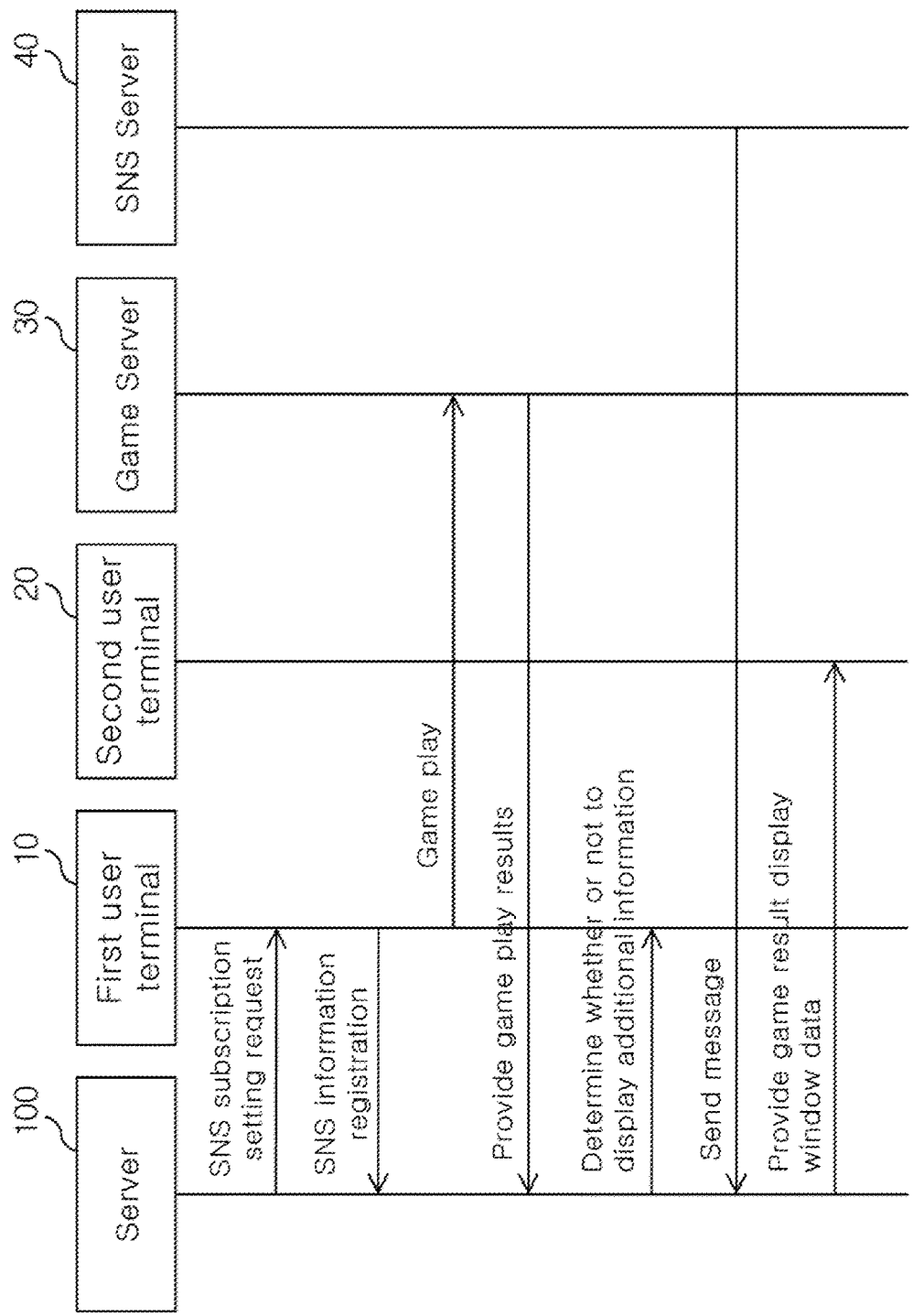
FIG. 6 is a diagram illustrating an execution process of the first embodiment of the present invention.

Meanwhile, FIG. 5 is an exemplary screen showing a game result display window according to a first embodiment of the present invention, and FIG. 6 is a diagram illustrating an execution process of the first embodiment of the present invention.

Referring to FIG. 4, first, the server 100 provides a registration interface for message feed subscription to the first user terminal 10 (S110).

The first user registers his or her social network service information through such a user interface. For example, the first user registers his or her Facebook ID and configures messages or posts loaded onto social network service so that they are subscribed.

However, the messages or posts are not actually subscribed. When the first user simply sends or posts a message on social network service, the server 100 collects the message and temporarily stores the message by putting it in a stack.

Meanwhile, when the first user accesses the game server 30 and plays game, the server 100 receives the game play results of the first user from the game server 30 and dynamically determines the size of the additional information display region of game result display window of the first user and whether or not to display additional information (S130).

In this case, the game play results of the first user may be received without any change (e.g., scores obtained in a game play process), and results (e.g., whether or not to display the additional information in the additional information display region) processed and analyzed by the game server 30 may be received.

The server 100 autonomously determines whether or not to display the additional information in the additional information display region of the first user if the additional information has not been directly provided by the game server 30.

If the game play results of the first user satisfy a predetermined specific condition, it may be determined to display the additional information.

If the additional information is determined to be displayed with respect to the first user, a separate information display area is displayed in the basic display region of the first user of the game result display window. To this end, the server 100 dynamically determines the size of the additional information display region of the first user.

That is, the server determines that the additional information display region of what size has to be divided in the basic display region of the first user and to be displayed.

In this case, the server 100 may determine the size of the additional information display region in proportion to a personal connection index in a previously subscribed and registered social network service of the first user. That is, in the social network service, the additional information display region of a user having a great ripple effect is set to be larger.

Meanwhile, the second user may access the game server 30 and may display a game result display window on a screen after playing game or while playing game.

To this end, when the second user selects a game result display window display function in the second user terminal 20, the second user terminal 20 requests game result display window data from the game server 30.

When the request of the second user terminal 20 is received from the game server 30, the server 100 provides the game result display window data to the second user terminal 20 through the game server 30.

Accordingly, the second user terminal 20 visually displays the game result display window on a screen as illustrated in FIG. 5.

Meanwhile, when the server 100 receives the request of the second user terminal 20, it retrieves additional information of the first user, incorporates the additional information into the game result display window data, and transfers the game result display window data to the second user terminal 20.

In this case, as illustrated in FIG. 5, a previously subscribed and registered social network service message of the first user may be stored in the stack, the message may be retrieved from the stack using a last in first out (LIFO) method, and the retrieved message may be incorporated into the game result display window data as additional information of the first user.

Referring to the example of FIG. 5, it may be seen that the message of the first user last received in the stack 141 is "Nice day today."

Accordingly, the message "Nice day today" is retrieved from the stack 141, incorporated into the game result display window data as additional information of the first user, and transferred to the second user terminal 20.

Accordingly, when the additional information is displayed in the game result display window on a screen of the second user terminal 20, as illustrated in FIG. 5, an additional information display region is separately divided within the basic display region of the first user. In this case, it may be seen that "Nice day today", that is, the most recent message of the first user, is displayed.

Meanwhile, the second user may directly access the server 100 without the intervention of the game server 30, and may request the game result display window data.

In this case, the second user terminal 20 receives the game result display window data from the server 100 through the same process as that described above, and visually displays the game result display window data on a screen.

Meanwhile, when the second user terminal 20 requests game result display window information including additional information of the first user during a single communication session or several times within a specific time, the server 10 retrieves a next message from the stack 141, incorporates the next message into game result display window data, and provides the game result display window data to the second user terminal 20.

If the first user has uploaded a new message or posts through social network service, the most recent message may be updated by retrieving a message at the top from the stack 141 and incorporating the message.

However, if the first user has not written a new message through the social network service and the same message is displayed in the game result display window displayed on a screen of the second user terminal 20, the server 100 may retrieve a next message from the stack 141 and provide the next message to the second user terminal 20 so that the same message is not repeatedly displayed.

That is, in reverse time, the articulation of the first user is included in game result display window data and provided to the second user terminal 20.

In this case, the server 100 may count that how many times the same message has been provided to the second user terminal 20 within a specific time or during a single communication session. If the number of messages provided exceeds a specific value, the server 100 may retrieve a next message from the stack 141.

Mode for Invention

Embodiment 2

Hereinafter, another embodiment of a message output method using a game result information window according to the present invention is described with reference to FIGS. 7 and 8.

Embodiment 2 illustrates a processing process of matching external information in real time depending on the game play results of the first user and displaying the external information in the game result display window.

Figure 7:
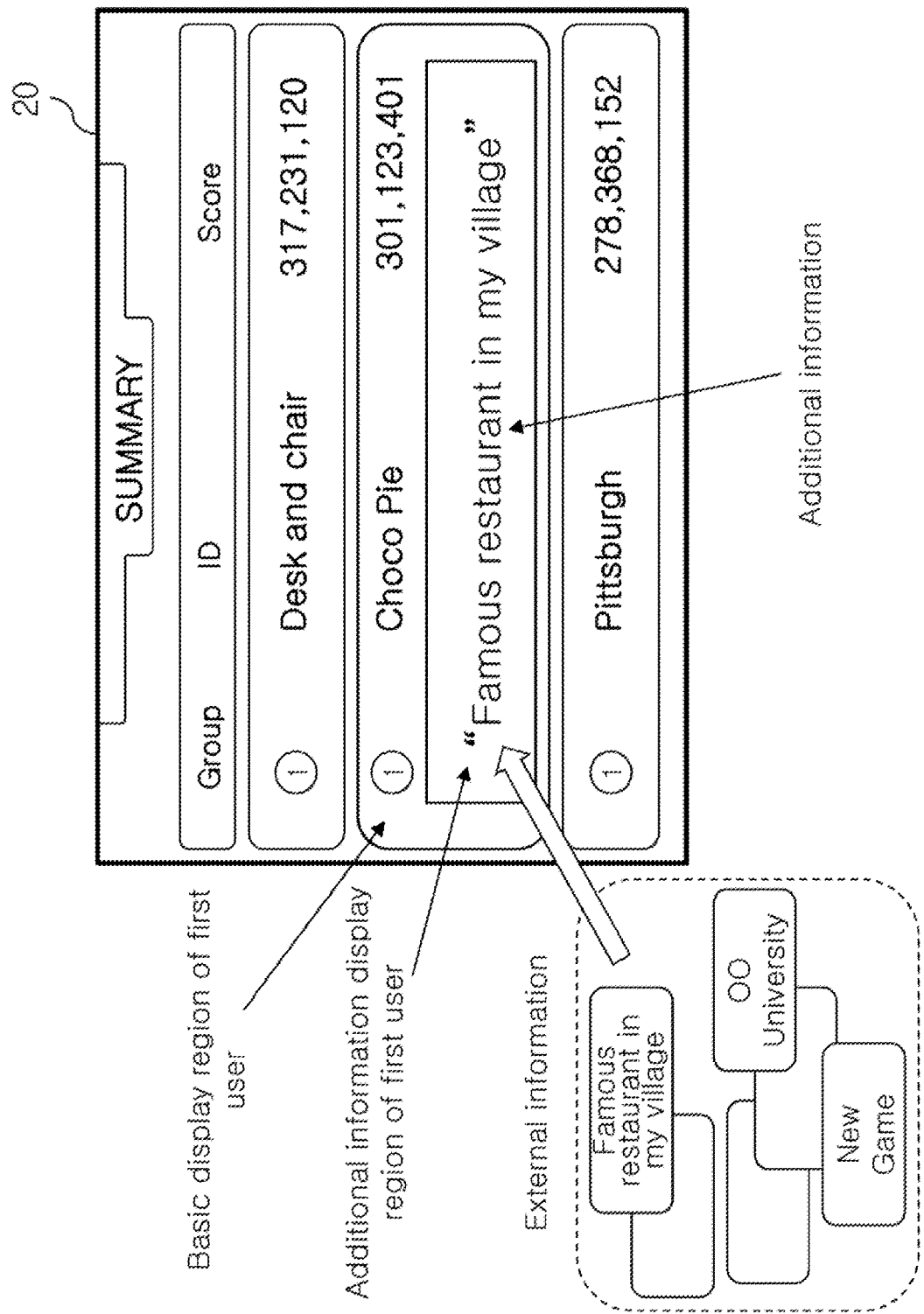
FIG. 7 is an exemplary screen showing a game result display window according to a second embodiment of the present invention.
Figure 8:
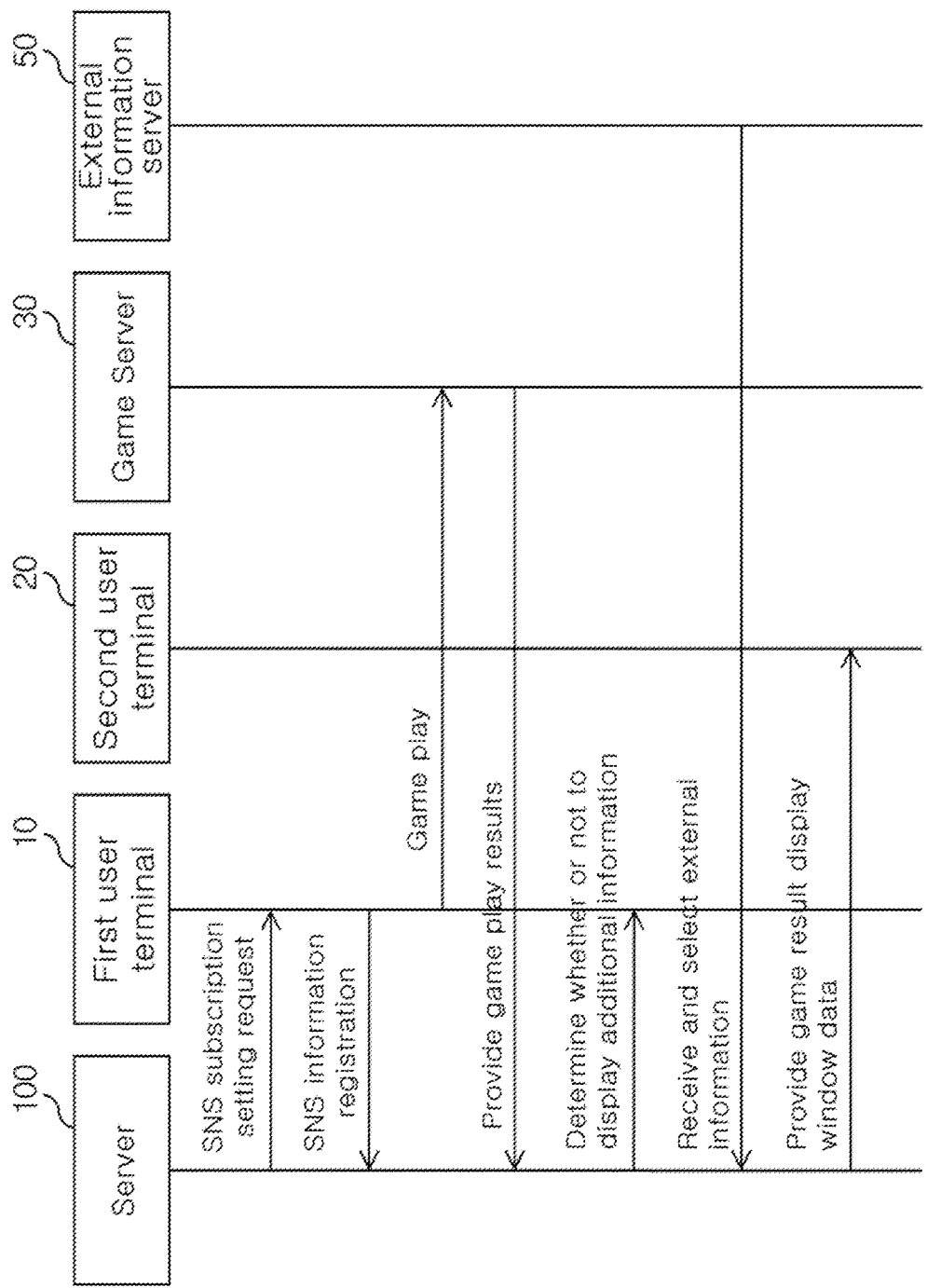
FIG. 8 is a diagram illustrating an execution process of the second embodiment of the present invention.

FIG. 7 is an exemplary screen showing a game result display window according to a second embodiment of the present invention, and FIG. 8 is a diagram illustrating an execution process of the second embodiment of the present invention.

In Embodiment 2, the server 100 first provides a user interface in which the type of external information may be selected to the first user terminal 10 (S120).

For example, any one of types or categories, such as "What school", "Place to live", "Company", and "Product introduction", may be selected.

Meanwhile, the server 100 may receive various types of external information from a specific third party and store the external information or may store a corresponding link. Preferably, pieces of external information have meta data, and a matched category selected by the user may be searched for or classified using the meta data.

Meanwhile, when the first user selects the type of external information, the server 100 stores the selected type in the account of the first user.

Thereafter, at step S130, when the first user plays game through the game server 30 using the first user terminal 10, the server 100 dynamically determines the size of the additional information display region of the game result display window of the first user and whether or not to display additional information of the first user using the game play results of the first user.

Meanwhile, when a request from the second user terminal 20 is received, the server 100 returns game result display window data including the game play results of users to be displayed in the game result display window. In this case, the size of the additional information display region and the additional information are further included with respect to the users whose additional information is displayed.

To this end, the server 100 selects one of pieces of previously stored external information, incorporates the selected external information into game result display window data as additional information of the first user, and transmits the game result display window data to the second user terminal (S140).

The external information is selected according to the following two algorithms.

First, at step S120, after external information corresponding to the type selected by the first user is classified, corresponding external information matched with the game play results of the first user is dynamically selected.

An algorithm for selecting the external information matched with the game play results may be implemented in various manners. Most simply, the external information may be matched in higher order depending on scores, or a keyword may be retrieved by analyzing the contents of game play and external information having a high relation may be selected.

A second method is a method of selecting the meta data of game content played by the first user regardless of the game play results of the first user.

That is, the game content itself has the meta data, and external information related to the corresponding meta data is selected.

In this case, the game play results of the first user are used to only determine whether the external information will be additionally displayed or not and to only determine the size of the additional information display region. The game play results of the first user are not taken into consideration regarding that whether the external information will be displayed or not.

Meanwhile, the process of selecting the external information has been described using the two methods. However, the size of the additional information display region determined at step S130 may be further extended depending on dynamically selected external information or additional effect processing may be performed.

That is, at step S140, with respect to the dynamically selected external information, the size of the additional information display region may be dynamically changed depending on a level of contribution of a provider who has provided the corresponding external information.

The level of contribution may mean a monetary or non-monetary price to pay.

Alternatively, an additional effect (video playback upon click, a sound effect, etc.) may be added to the additional information display region.

Embodiment 3

Hereinafter, another embodiment of a message output method using a game result information window according to the present invention is described with reference FIGS. 9 and 10.

Embodiment 3 illustrates a process of displaying external information, displayed in the additional information display region of the first user, in the additional information display region of the second user when the second user selects the additional display region of the first user in the game result display window.

At step S140, the second user terminal 20 that has received the game result display window data from the server 100 displays the game result display window on a screen, as illustrated in FIG. 7.

In this case, the external information of the first user is displayed in the additional information display region of the first user. When the second user selects the external information, the second user terminal 20 requests a condition for selecting the corresponding external information from the server 100.

Accordingly, at step S130, the server 100 analyzes a log that the corresponding external information has been selected regarding the first user, and retrieves a game play condition on which the corresponding external information has been selected regarding the first user.

Furthermore, the server 100 provides the second user terminal 20 with the game play condition for selecting the corresponding external information (S150).

The second user may expect that the corresponding external information is displayed in the additional information display region of his or her game result display window by selecting which game using which method.

Meanwhile, the server 100 stores reservation information so that the external information can be selected for the second user terminal 20.

Furthermore, if the game play results of the second user satisfy the provided game play condition within a specific period, the server incorporates the corresponding external information into game result display window data as additional information of the second user (S151).

Figure 9:
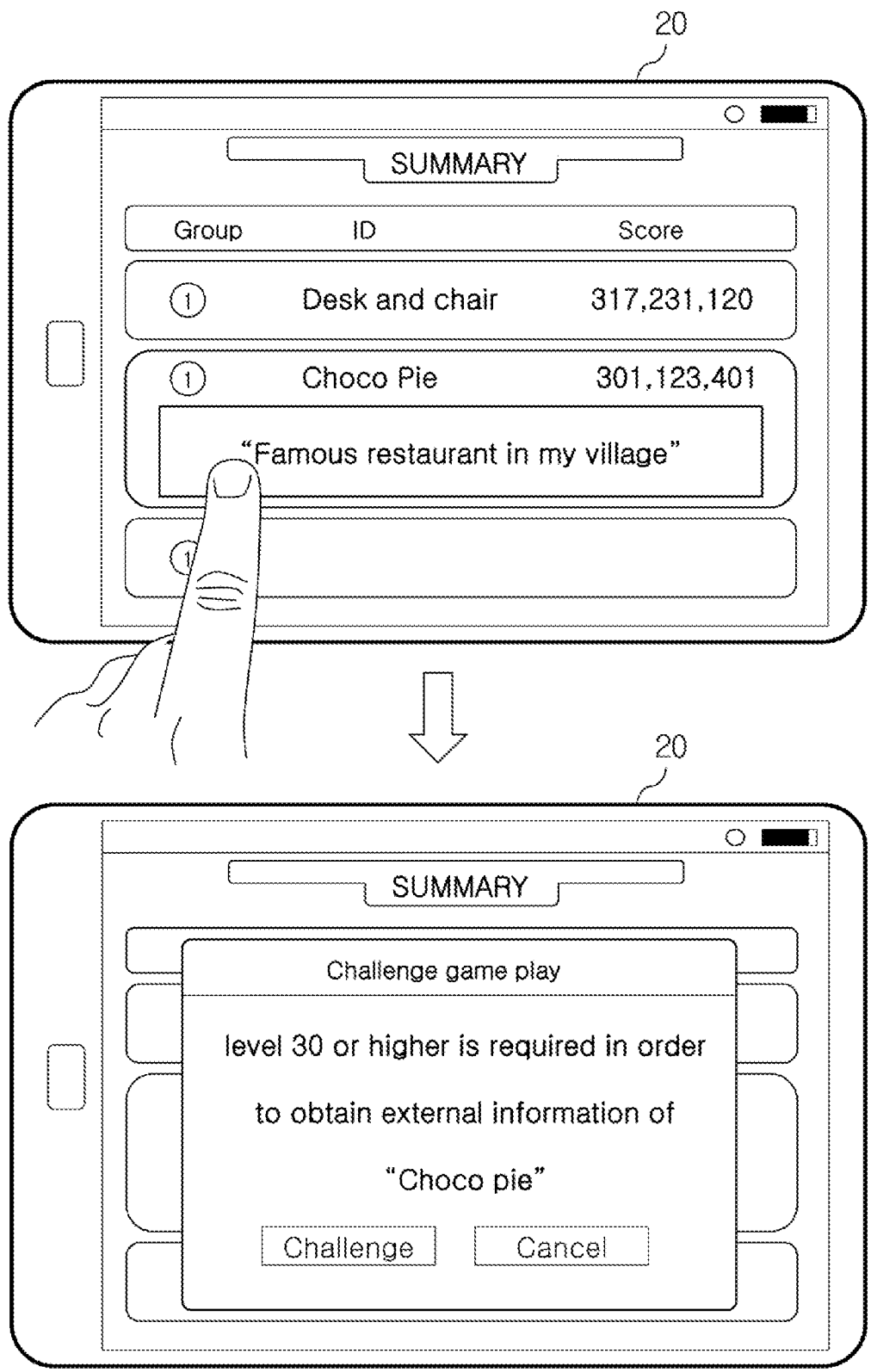
FIG. 9 is an exemplary screen showing a game result display window according to a third embodiment of the present invention.
Figure 10:
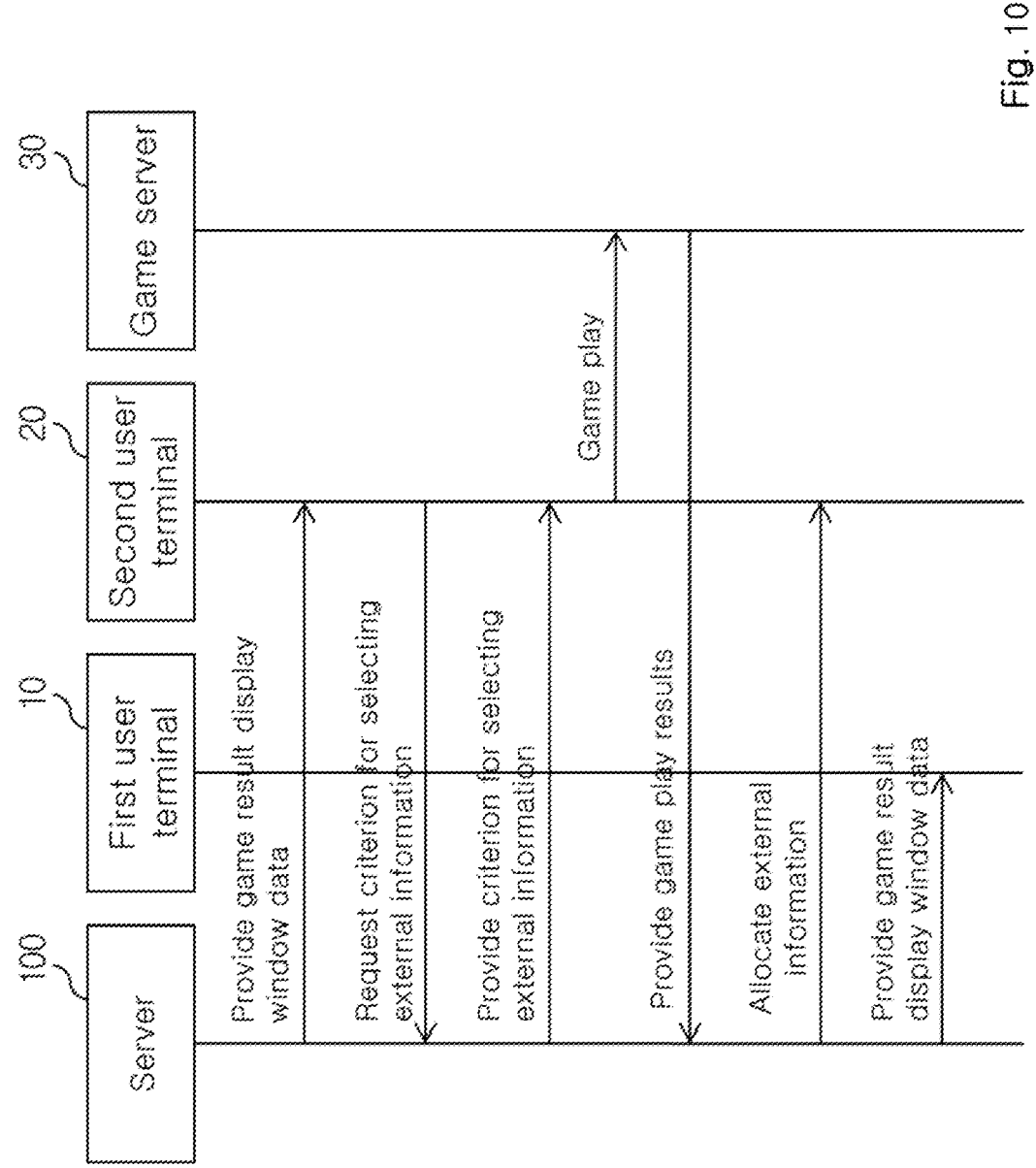
FIG. 10 is a diagram illustrating an execution process of the third embodiment of the present invention.

From FIG. 9, it may be seen that "level 30 or higher is required to obtain external information of Choco pie" has been displayed.

That is, if the second user wants to take external information and to have the same external information displayed in his or her additional information display region while watching others' game result display window, the second user may have the external information displayed in his or her additional information display region by selecting the additional information display region of a corresponding person (i.e., the first user), requesting a game play condition, and achieving the game play condition within a specific time.

Accordingly, a competition for occupying external information displayed its own additional information display region is made possible. Users can compete with anonymous persons through game. This acts as one factor to arouse an interest in game.

The message output method using a game result information window according to the embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

The embodiments of the present invention have been described in detail, but the range of right of the present invention is not limited thereto. The range of right of the present invention also includes a variety of modifications and changes which are defined in the appended claims and will be performed by those skilled in the art using the basic concept of the present invention.

The invention claimed is:

1. A message output method using a game result information window, comprising:
a first step of dynamically determining, by a computer system, a size of an additional information display region of a game result display window of a first user and whether or not to display additional information of the first user using game play results of the first user; and
a second step of retrieving, by the computer system, the additional information of the first user, incorporating the additional information into game result display window data and transmitting the game result display window data to a second user terminal so that the game result display window is displayed, wherein if the additional information of the first user is determined to be displayed, the retrieved additional information of the first user is displayed in the additional information display region of the first user of the game result display window.

2. The message output method of claim 1, wherein:
the game result display window visually displays game play results of two or more users, and
the game result display window comprises a basic display region in which the game play results of each user are displayed and further comprises the additional information display region in which additional information of at least one user is displayed.

3. The message output method of claim 1, further comprising a third step of providing a registration interface for message feed subscription to the first user terminal prior to the first step.

4. The message output method of claim 3, wherein in the second step, a previously subscribed and registered social network service message of the first user is stored in a stack using a last in first out (LIFO) method, and the message is retrieved from the stack and incorporated into the game result display window data as the additional information of the first user.

5. The message output method of claim 3, wherein in the first step, if the additional information of the first user is determined to be displayed, the size of the additional information display region is determined in proportion to a personal connection index in a previously subscribed and registered social network service of the first user.

6. The message output method of claim 3, wherein in the first step, if information about the first user is further provided within an identical session of the second user or within a specific time, a next message is retrieved from a stack and updated.

7. The message output method of claim 1, further comprising a fourth step of providing a user interface to the first user terminal so that an external information type is able to be selected prior to the first step, wherein the external information comprises meta data not related to a specific user and for content and type classification and is previously collected and loaded information.

8. The message output method of claim 7, wherein in the second step, external information which belongs to pieces of external information corresponding to the external information type selected in the fourth step and which is matched with the game play results of the first user is dynamically selected and is incorporated into the game result display window data as the additional information of the first user.

9. The message output method of claim 7, wherein in the second step, external information which belongs to pieces of external information corresponding to the external information type selected in the fourth step and which is matched with meta data of game content played by the first user is dynamically selected and is incorporated into the game result display window data as the additional information of the first user.

* * * * *